United States Patent
Biggerstaff et al.

(10) Patent No.: US 10,932,410 B2
(45) Date of Patent: Mar. 2, 2021

(54) SPILL SAVER CONTROL SYSTEM FOR COMBINE HARVESTER UNLOADING SYSTEM

(71) Applicant: AGCO Corporation, Duluth, GA (US)

(72) Inventors: Joseph M. Biggerstaff, Garden Plain, KS (US); Frederic Ducroquet, Châteaubriand (FR)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/340,213

(22) PCT Filed: Oct. 4, 2017

(86) PCT No.: PCT/IB2017/001207
§ 371 (c)(1),
(2) Date: Apr. 8, 2019

(87) PCT Pub. No.: WO2018/069758
PCT Pub. Date: Apr. 19, 2018

(65) Prior Publication Data
US 2020/0037507 A1    Feb. 6, 2020

Related U.S. Application Data

(60) Provisional application No. 62/406,640, filed on Oct. 11, 2016.

(51) Int. Cl.
*A01D 41/12*    (2006.01)
*A01D 90/10*    (2006.01)
(Continued)

(52) U.S. Cl.
CPC ......... *A01D 41/1217* (2013.01); *A01D 90/10* (2013.01); *B65G 33/14* (2013.01); *B65G 33/22* (2013.01); *B65G 67/24* (2013.01)

(58) Field of Classification Search
CPC .... A01D 41/1217; A01D 90/10; B65G 33/22; B65G 33/14; B65G 67/24
(Continued)

(56) References Cited

U.S. PATENT DOCUMENTS 4,160,621 A * 7/1979 Bishop ............... B60P 1/38
                                                     37/142.5
4,289,440 A   9/1981 Walberg
(Continued)

FOREIGN PATENT DOCUMENTS

EP    2245917 A2   11/2010
EP    2 279 655 A1  2/2011
(Continued)

OTHER PUBLICATIONS

European Patent Office, International Search Report for International Application No. PCT/IB20171001207, dated Dec. 18, 2017.
(Continued)

*Primary Examiner* — James Keenan

(57) ABSTRACT

An unloading system for a combine harvester having a belt-driven unloading auger assembly and a spill saver door mounted proximate to a discharge end of the unloading auger assembly. Engagement of the belt drive is controlled by a first hydraulic cylinder. Opening of the spill saver door is controlled by a second hydraulic actuator. The first and second hydraulic cylinders are hydraulically connected in parallel.

6 Claims, 4 Drawing Sheets

(51) Int. Cl.
*B65G 33/14* (2006.01)
*B65G 67/24* (2006.01)
*B65G 33/22* (2006.01)

(58) Field of Classification Search
USPC ......................................................... 198/671
See application file for complete search history.

(56) References Cited

U.S. PATENT DOCUMENTS

| | | | |
|---|---|---|---|
| 5,791,087 A * | 8/1998 | Strab | E05F 15/56 |
| | | | 49/360 |
| 7,452,180 B2 * | 11/2008 | Talbi | A01D 41/1217 |
| | | | 414/812 |
| 7,584,836 B2 | 9/2009 | McCully et al. | |
| 7,644,816 B2 * | 1/2010 | Veiga Leal | A01D 41/1217 |
| | | | 193/22 |
| 8,265,837 B2 * | 9/2012 | Ricketts | B65G 33/22 |
| | | | 198/671 |
| 10,358,296 B2 * | 7/2019 | Guymon | B65G 33/14 |
| 2008/0149463 A1 | 6/2008 | McCully et al. | |
| 2010/0287729 A1 * | 11/2010 | Jin | E05F 3/12 |
| | | | 16/52 |
| 2016/0057927 A1 * | 3/2016 | Bojsen | A01D 41/1217 |
| | | | 414/526 |

FOREIGN PATENT DOCUMENTS

| | | |
|---|---|---|
| EP | 2 497 354 A1 | 9/2012 |
| EP | 2732688 A1 | 5/2014 |

OTHER PUBLICATIONS

UK Intellectual Property Office, Search Report for related UK Application No. 1702754.1, dated Aug. 22, 2017.

* cited by examiner

SPILL SAVER CONTROL SYSTEM FOR COMBINE HARVESTER UNLOADING SYSTEM

FIELD OF INVENTION

The invention relates to combine harvester unloading systems that include a spill saver door mounted at the discharge end of an auger tube. In particular, the invention relates to a system for controlling opening and closing of the spill saver door.

BACKGROUND OF THE INVENTION

Combine harvesters, used inter alia for the harvesting of grain crops, are fitted with unloading systems that typically include a deployable unloading auger for the unloading of grain from an on-board tank into a trailer driven alongside. The unloading auger is commonly powered by a belt-drive system that is selectively engaged by the operator to start and stop the unloading process.

A known problem is the spilling of residue grain present in the discharge end of the unloading auger after an unloading sequence, the spillage sometimes being compounded by a slow rotation of the auger when the tube is folded away. It is well known to provide a spill saver door which covers at least a portion of the discharge end of the auger tube when the unloading system is inactive.

Spill saver doors of an early design are spring-loaded to keep the door closed when not unloading. Upon activation of the unloading system, the weight of the grain forces the door open against the spring force. U.S. Pat. No. 7,584,836 goes further and discloses a spill saver door design that seeks to overcome problems associated with spring-loaded systems, the system including an actuator-controlled door which operates independently of the presence of grain in the unloading tube. The actuator is described as being a fluid controlled actuator or an electrically powered actuator.

The provision of an hydraulically-controlled spill saver requires additional pipework, valves and control circuitry to control the hydraulic cylinder.

SUMMARY OF THE INVENTION

In accordance with the invention there is provided an unloading system for a combine harvester comprising:
- an elongate auger tube having a discharge end and containing a helical unloading auger rotatably operable for conveying grain toward the discharge end;
- a belt drive system adapted to selectively drive the unloading auger and comprising a tensioning pulley coupled to a first hydraulic cylinder, wherein movement of the tensioning pulley between an engaged and a disengaged position is controlled by the first hydraulic cylinder;
- a spill saver door mounted to the auger tube proximate to the discharge end, the spill saver door being moveable from an open position to a closed position by a second hydraulic cylinder;
- a hydraulic control circuit in which the first and second hydraulic cylinders are hydraulically connected in parallel.

Advantageously, the invention ties together, by hydraulic means, the operation of the unloading auger and the operation of the spill saver door thus providing a simple and robust control system whilst avoiding the need for control logic circuitry.

The invention exploits the relationship between the requirements of the unloading auger control and the spill saver control to reduce the component count and simplify the overall system.

In a preferred embodiment the second hydraulic cylinder is single-acting. A spring may be provided either internally or externally of the second hydraulic cylinder to bias the spill saver door into the closed or the open position when the pressure to the second hydraulic cylinder is released.

The hydraulic control circuit may comprise a sequence valve that is configured so that the spill saver door is opened by the second hydraulic cylinder before the tensioning pulley is moved to the engaged position by the first hydraulic cylinder. Advantageously, at the commencement of an unloading event the spill saver door is opened before the unloading auger is activated and thus reduces the risk of grain being pushed up against a partially-opened spill saver door.

The hydraulic control circuit may comprise a one-way restrictor valve connected on a supply side of the second hydraulic cylinder to slow closing of the spill saver door. Advantageously, this allows any residue grain to fall into the trailer before the spill saver door is closed.

BRIEF DESCRIPTION OF THE DRAWINGS

Further advantages of the invention will become apparent from reading the following description of specific embodiments with reference to the appended drawings in which.

Corresponding reference characters indicate corresponding parts throughout the views of the drawings.

DETAILED DESCRIPTION OF THE INVENTION

The invention will now be described in the following detailed description with reference to the appended drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
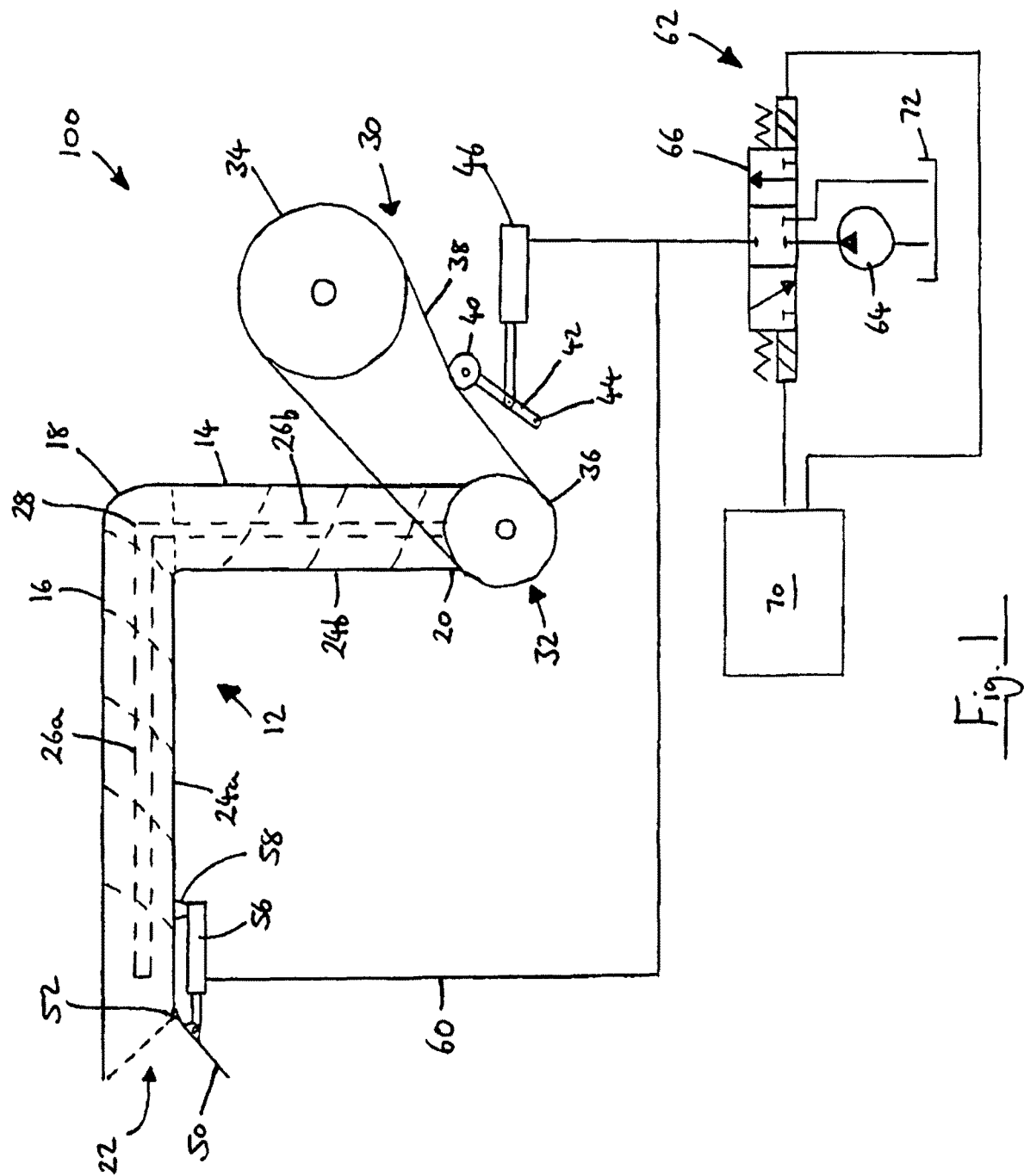
FIG. 1 is a schematic diagram of an unloading system in accordance with a first embodiment of the invention.

FIG. 1 shows, in schematic form, an unloading system 100 for a combine harvester in accordance with a first embodiment of the invention.

The unloading system comprises an auger assembly 12 itself comprising an upright portion 14 and a laterally-extending portion 16 joined at a pivoting elbow connection 18. As is known, this 'turret' style arrangement allows the laterally-extending portion to pivot around a vertical axis that is substantially coaxial with the upright portion 14, to allow the auger to be deployed into an unloading position and folded into a transport position.

The auger assembly 12 is operable to convey grain stored in an on-board tank (not shown) from an inlet end 20 at the base of the upright portion 14, to a discharge end 22 at the distal end of the laterally-extending portion 16. Each of the auger portions 14,16 comprise an elongate tube 24a,24b, containing a respective helical screw conveyor 26a,26b. The two screw conveyors 26a,26b are drivingly coupled within the elbow connection 18 by a universal joint or other suitable gearbox represented at 28.

A belt drive system 30 is operable to selectively drive the auger assembly 12 via a suitable gearbox located proximate to the inlet end 20 and represented at 32. The belt drive system 30 comprises a first 'driving' pulley 34 and a second 'driven' pulley 36 drivingly connected by a belt 38. The first pulley 34 derives torque from a prime mover such as an on-board internal combustion engine via a drive transmission (not shown). The second pulley 36 is drivingly coupled to screw conveyors 26.

The belt drive system 30 further comprises a tensioning pulley 40 rotationally mounted on a spring-retracted pivot arm 42 which pivots around pivot axis 44. A first hydraulic cylinder 46 is secured to a frame member of the combine and is coupled to the pivot arm 42. By controlling the first hydraulic cylinder 46 the tensioning pulley 40 can be selectively engaged with the belt 38 to cause tensioning of the belt 38 and drive engagement between the first and second pulleys 34,36. In other words, the first hydraulic cylinder 46 controls selective engagement of the belt drive system 30 and thus activation of the auger assembly 12.

The first hydraulic cylinder 46 is single-acting and is configured to engage the belt drive 30 when pressurised. A spring (not-shown) is attached to the pivot arm to retract such when hydraulic pressure is removed from the cylinder 46.

It should be appreciated that the belt-drive system 30 is represented in a simple form and many alternative configurations are envisaged within the scope of the invention. For example, the second pulley 36 may be drivingly coupled to the screw conveyor by further transmission apparatus including further belt drives, chain drives and/or gear boxes. Likewise, the first pulley 34 may be connected to the prime mover via one or more intermediate drive stages, gear boxes, belt drives and/or chain drives.

Turning attention now to the discharge end 22 of the auger assembly 12, a spill saver door 40 is pivotally mounted to the distal end of the auger tube 24a. Although represented as pivoting around a lower horizontal axis 52, it should be appreciated that the spill saver door 50 may be configured in alternative ways provided that it is movable between an open position (in which grain can flow freely from the tube 24a) and a closed position (in which the discharge end is at least partially covered to inhibit grain spillage). The spill saver door 50 is represented in FIG. 1 in an open position (solid line) and a closed position (dashed line).

A second hydraulic cylinder 56 is secured to the auger tube 24a by a bracket 58 and is pivotally coupled to the spill saver door 50 in a similar manner to that disclosed by U.S. Pat. No. 7,584,836 by way of example. The second hydraulic cylinder 56 is operable to control opening and closing of the spill saver door 50. In the preferred arrangement shown, the hydraulic cylinder 56 is configured to close the door 50 by extending.

The second hydraulic cylinder 56 is single acting and is configured to retract when hydraulic pressure is supplied via hydraulic connection 60. It should be understood that the hydraulic connection 60 is represented schematically and, in practice, may be secured to the exterior of auger tube 24.

The spill saver door may be spring loaded to bias the door into the closed position.

Turning attention now to the discharge end 22 of the auger assembly 12, a spill saver door 50 is pivotally mounted to the distal end of the auger tube 24a. Although represented as pivoting around a lower horizontal axis 52, it should be appreciated that the spill saver door 50 may be configured in alternative ways provided that it is movable between an open position (in which grain can flow freely from the tube 24a) and a closed position (in which the discharge end is at least partially covered to inhibit grain spillage). The spill saver door 50 is represented in FIG. 1 in an open position (solid line) and a closed position (dashed line).

A hydraulic pressure source, represented as a pump 64, is selectively connected to the hydraulic cylinders 46,56 via a 3-position directional control valve 66 in response to an electrical control signal generated by ECU 70 when activation of the unloading system is commanded, typically by an operator. As such, the first and second hydraulic cylinders 46,56 are extended and retracted respectively to simultaneously engage the belt drive 30 and open the spill saver door 50.

The hydraulic circuit 62, and specifically the directional control valve 66, is also configured to relieve the hydraulic pressure at the cylinders 46,56 by selectively connecting such to a reservoir 72 in response to an electrical control signal generated by ECU 70, when deactivation of the unloading system is commanded. Upon such deactivation, the spill saver door 50 is closed at the same time as the belt drive 30 is disengaged.

To summarise the three states of the hydraulic system of FIG. 1:

In a neutral state (centre valve position) the hydraulic cylinders 46,56 are hydraulically isolated. This maintains the tensioning pulley 40 and the spill saver door 50 in the current state.

In an 'activate' state (valve 66 shifted to the left) the pump 64 is connected to the hydraulic cylinders 46,56 to simultaneously engage the belt drive 30 and open the spill saver door 50.

In a 'deactivate' state (valve 66 shifted to the right) any pressure to the hydraulic cylinders 46,56 is relieved by connecting the cylinders 46,56 to the reservoir 72.

Figure 2:
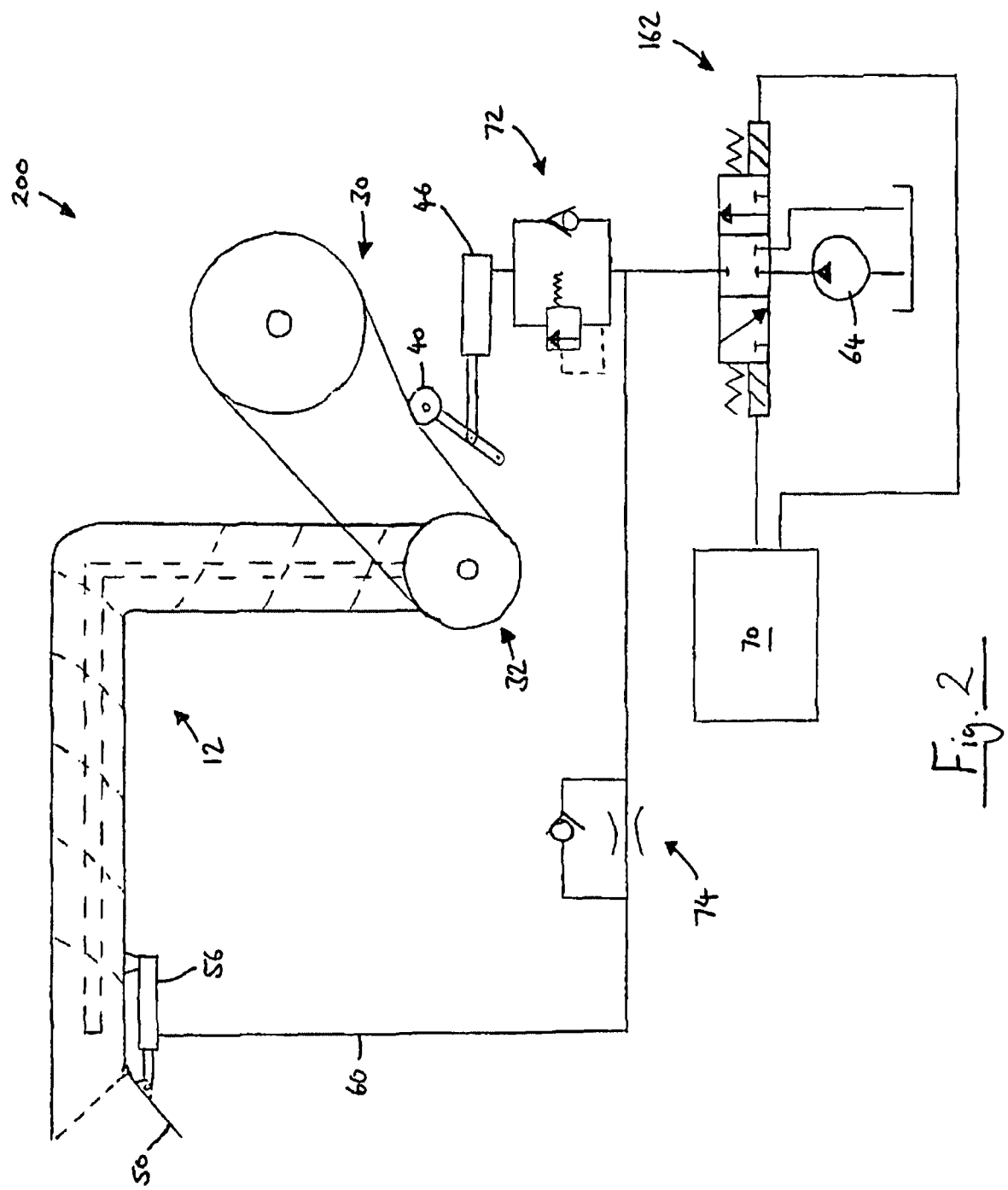
FIG. 2 is a schematic diagram of an unloading system in accordance with a second embodiment of the invention.

The hydraulic circuit 62 may be modified as per a second embodiment of a unloading system 200 as shown in FIG. 2, wherein a hydraulic circuit 162 further comprises a sequence valve 72 which is provided between the directional control valve 66 and the first hydraulic cylinder 46. The sequence valve 72 is configured so as to delay the engagement of the unloading auger 12 wherein the spill saver door 50 is opened by the second hydraulic cylinder 56 before the tensioning pulley 40 is moved to the engaged position by the first hydraulic cylinder 46.

The hydraulic circuit 162 further comprises a one-way restrictor valve 74 in the hydraulic connection 60 to the second hydraulic cylinder 56. The restrictor valve 74 serves to delay or slow the closing of the spill saver door 50 when the pressure supplied to the second hydraulic cylinder 56 is removed. This allows any residue grain present in the end of the auger tube 16 to be discharged before the door 50 is fully closed.

It should be understood that, while both shown, one of the sequence valve 72 and restrictor valve 74 may be omitted without affecting operating of the remaining other.

Figure 3:
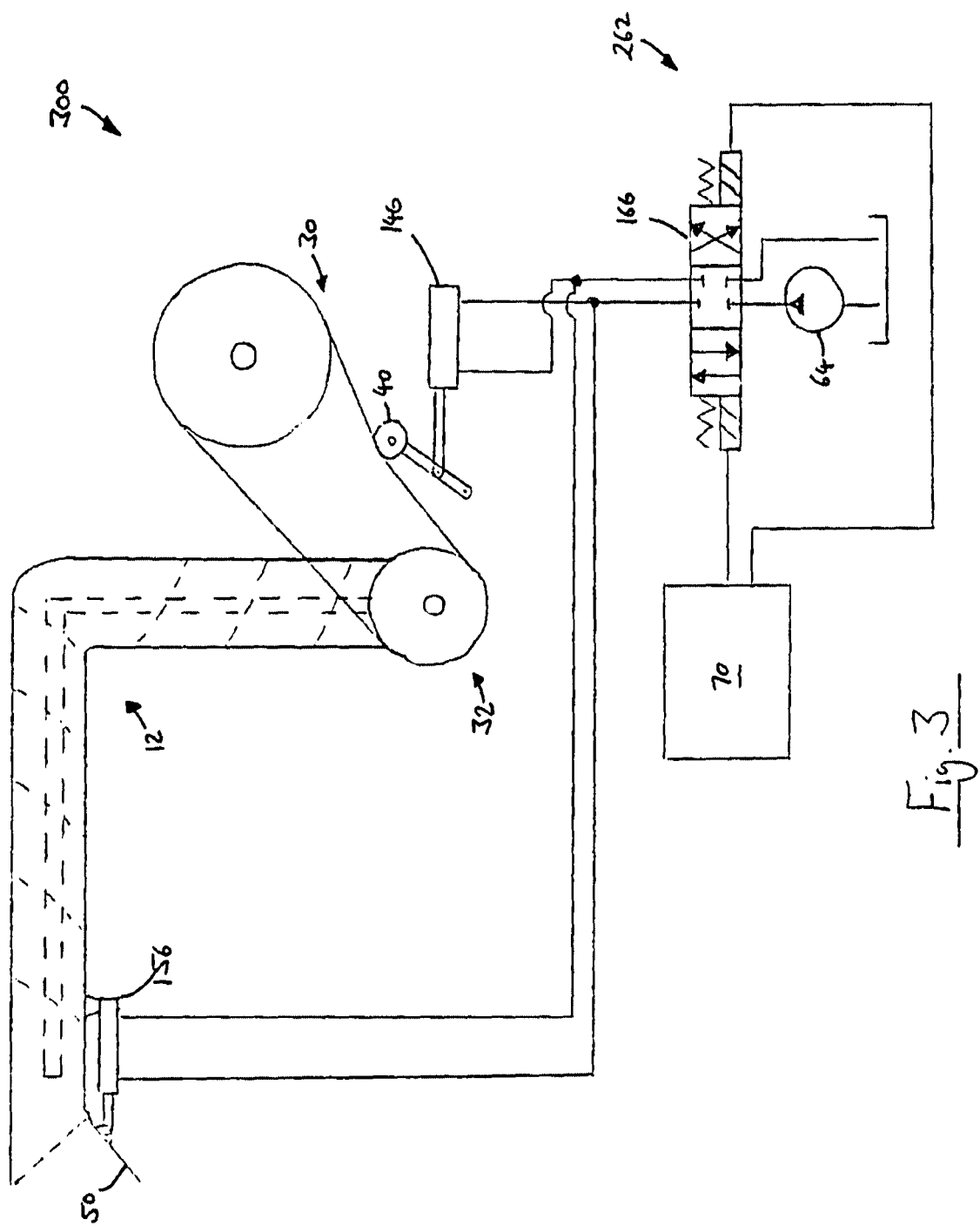
FIG. 3 is a schematic diagram of an unloading system in accordance with a third embodiment of the invention; and, FIG. 4 is a schematic diagram of an unloading system in accordance with a fourth embodiment of the invention.

FIG. 3 shows an unloading system 300 according to a third embodiment which is the same as the unloading system 100 of FIG. 1 except that the first and second hydraulic cylinders 46,56 have been replaced with dual-acting cylinders 146,156. The hydraulic circuit 262 comprises a modified directional control valve 166 and associated plumbing to control the hydraulic cylinders 146,156 accordingly.

Figure 4:
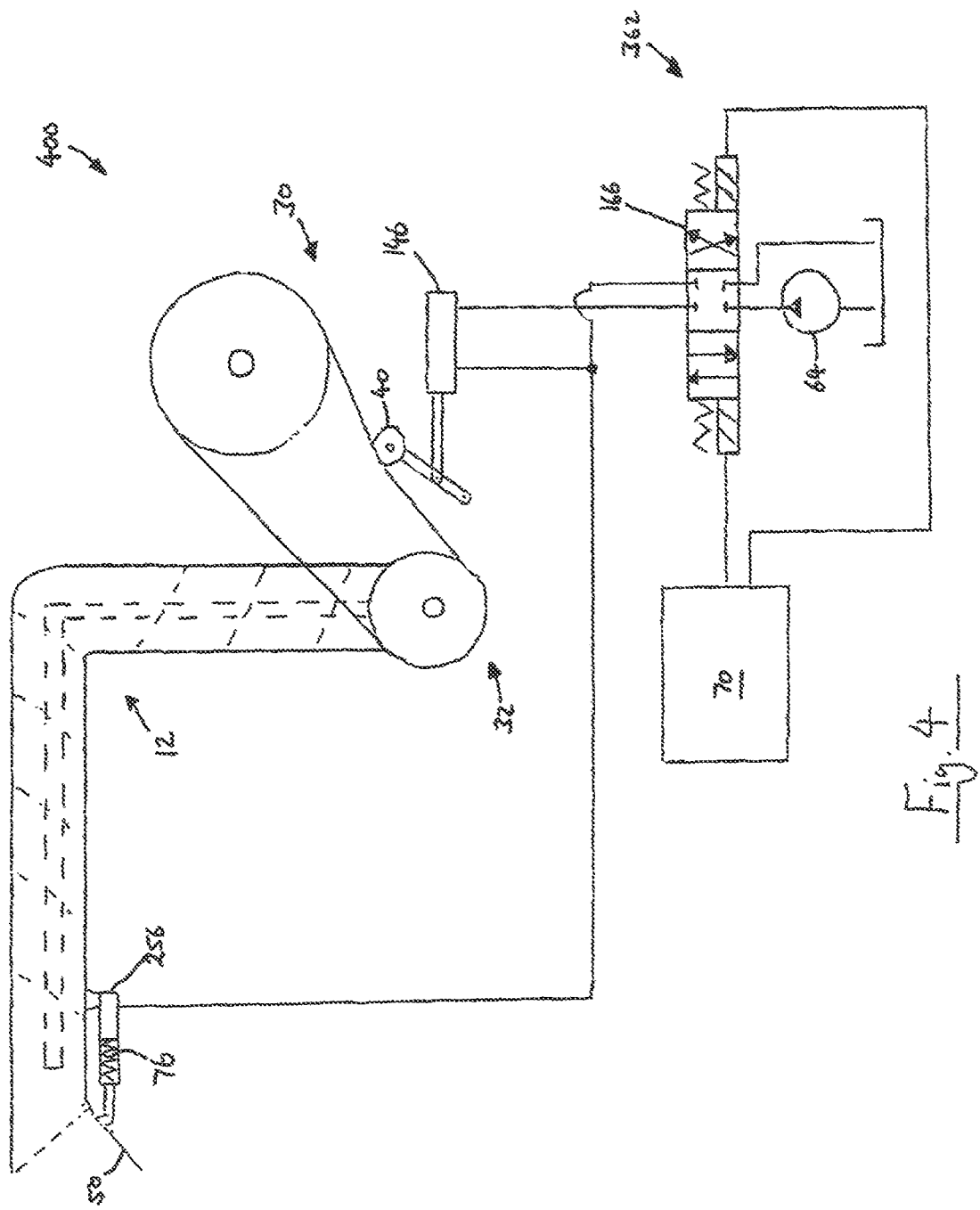

FIG. 4 shows an unloading system 400 according to a third embodiment wherein the first hydraulic cylinder 146 is dual-acting and the second hydraulic cylinder 256 is single-acting. However, in this case, the second hydraulic cylinder 256 is configured to close the spill saver door 50 in response to applied pressure via hydraulic connection 60. A spring 76 is integrated with second hydraulic cylinder 256 to force the spill saver door 50 open when pressure to the cylinder 256 is removed. The hydraulic circuit 362 is adapted accordingly to control the respective hydraulic cylinders 146,256 in response to commands received via ECU 70.

In summary there is provided an unloading system for a combine harvester comprises a belt-driven unloading auger assembly and a spill saver door mounted proximate to a discharge end of the unloading auger assembly. Engagement of the belt drive is controlled by a first hydraulic cylinder. Opening of the spill saver door is controlled by a second hydraulic actuator. The first and second hydraulic cylinders are hydraulically connected in parallel for simultaneous, or near-simultaneous, actuation.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiment. Accordingly, other aspects and a more comprehensive understanding of the invention may be obtained by referring to the detailed description of the exemplary embodiments taken in conjunction with the accompanying drawing.

The invention claimed is:

1. An unloading system for a combine harvester comprising:
   an elongate auger tube having a discharge end and containing a helical unloading auger rotatably operable for conveying grain toward the discharge end;
   a belt drive system adapted to selectively drive the unloading auger and comprising a tensioning pulley coupled to a first hydraulic cylinder, wherein movement of the tensioning pulley between an engaged and a disengaged position is controlled by the first hydraulic cylinder;
   a spill saver door mounted to the auger tube proximate to the discharge end, the spill saver door being moveable from an open position to a closed position by a second hydraulic cylinder;
   a hydraulic control circuit in which the first and second hydraulic cylinders are hydraulically connected in parallel, wherein the hydraulic control circuit comprises a sequence valve configured so that the spill saver door is opened by the second hydraulic cylinder before the tensioning pulley is moved to the engaged position by the first hydraulic cylinder, and a one-way restrictor valve connected on a supply side of the second hydraulic cylinder configured to delay closing of the spill saver door so that the spill saver door is closed by the second hydraulic cylinder after the first hydraulic valve moves the tensioning pulley to the disengaged position thereby stopping rotation of the unloading auger.

2. The unloading system according to claim 1, wherein the spill saver door is pivotally mounted to the auger tube along a substantially horizontal hinge axis.

3. The unloading system according to claim 1, wherein the first hydraulic cylinder is single acting.

4. The unloading system according to claim 3, wherein the second hydraulic cylinder causes the spill saver door to open when pressurised.

5. The unloading system according to claim 3, wherein the second hydraulic cylinder causes the spill saver door to close when pressurised.

6. The unloading system according to claim 1, wherein the belt drive system further comprises a drive pulley in driving engagement with an engine, and a driven pulley coupled to the unloading auger, and a belt connecting the drive pulley and the driven pulley, wherein the tensioning pulley serves to tighten the belt when in the engaged position.

* * * * *